United States Patent [19]

Kohsaka

[11] Patent Number: 4,864,200
[45] Date of Patent: Sep. 5, 1989

[54] MOTOR SPEED CONTROL APPARATUS

[75] Inventor: Yoshiaki Kohsaka, Fukaya, Japan

[73] Assignee: Kabushiki Kaisha Toshiba, Kawasaki, Japan

[21] Appl. No.: 168,952

[22] Filed: Mar. 16, 1988

[30] Foreign Application Priority Data

Mar. 31, 1987 [JP] Japan ................................. 62-75899

[51] Int. Cl.$^4$ ............................................. H02P 5/00
[52] U.S. Cl. ................................. 388/812; 388/810; 388/900
[58] Field of Search ............................... 318/301–322, 318/326–329, 336, 337–342, 606, 600–604, 607, 608, 603, 66–75

[56] References Cited

U.S. PATENT DOCUMENTS

| | | | |
|---|---|---|---|
| 4,203,061 | 5/1980 | Minakuchi | 318/318 |
| 4,386,300 | 5/1983 | Ogawa | 318/314 |
| 4,418,304 | 11/1983 | Iwai | 318/314 |
| 4,591,768 | 5/1986 | Kudelski | 318/314 |
| 4,613,799 | 9/1986 | Sumi | 318/314 |
| 4,680,516 | 7/1987 | Guzik et al. | 318/314 |
| 4,739,238 | 4/1988 | Sonobe et al. | 318/314 |

OTHER PUBLICATIONS

Kornhaas et al., "So funktioniert ein Videorecorder", Funkschau, No. 13, 1984.

Primary Examiner—William M. Shoop, Jr.
Assistant Examiner—David Martin
Attorney, Agent, or Firm—Cushman, Darby & Cushman

[57] ABSTRACT

A speed detector outputs a deviation, from a desired rotation speed, of the rotation speed of a capstan motor for driving a tape. A phase detector outputs a phase deviation, from a reference signal, of a reproduction control signal. When in a recording mode, in which only speed control is effected, the capstan motor is driven on the basis of a signal obtained by integrating the integration output of the speed detector. When in a reproduction mode, in which speed and phase controls are effected, the capstan motor is driven on the basis of a signal obtained by adding the deviation output of the speed detector to a signal derived by integrating the deviation output of the phase detector. Further, the capstan motor is driven on the basis of the integration data, which is stored in a data register in the reproduction mode, at the time of transition from the reproduction mode to the recording mode.

17 Claims, 6 Drawing Sheets

MOTOR SPEED CONTROL APPARATUS

Background of the Invention

1. Field of the Invention

This invention relates to a motor speed control apparatus for controlling the rotation speed and phase of a motor, and more particularly, to a motor speed control apparatus for controlling the rotation speed of a motor set in an operation mode in which no phase control is necessary.

2. Description of the Related Art

A video recorder (VTR) has a capstan motor which drives a capstan rotation shaft. In this case, two drive methods are known: (1) a direct drive method using the rotation shaft of a capstan motor directly as a capstan and (2) a belt drive method for driving a capstan by a capstan motor through a belt. The capstan motor functions to drive a tape so that a control signal recorded on the tape is synchronized with a predetermined reference signal in the reproduction mode. It also functions to drive the tape at a constant speed in the recording mode. Therefore, it is necessary to provide two control systems including a speed control system and a phase control system. However, it is not necessary to effect the phase control in the recording mode since it is only required to drive the tape at a constant speed.

The following motor control apparatus is known which includes speed and phase control systems to control a motor to be set in an operation mode in which no phase control is necessary. That is, a frequency generator mounted on the capstan rotation shaft which is driven by the capstan motor generates a signal of a frequency which is proportional to the rotation speed of the motor The signal is amplified by an amplifier circuit, and then converted to a pulse signal by a Schmitt trigger circuit. An output signal from the Schmitt trigger circuit is supplied to a speed detector which in turn derives the deviation of the frequency of the pulse signal from the desired frequency.

The frequency of the output pulse signal from the Schmitt trigger circuit is divided by a frequency divider. An output signal from the frequency divider is supplied to a reset terminal of a recording reference signal generator via a mode selection switch which is closed in a transitional recording mode or in a transition from the reproduction mode to the recording mode. Further, the output signal of the frequency divider is supplied to the recording terminal of a first changeover switch. The reproduction terminal of the first changeover switch is connected to receive a control signal which is derived by amplifying a reproduction control signal recorded on the tape and shaping the waveform of the amplified signal.

The output signal of the recording reference signal generator is supplied to the recording terminal of a second change-over switch. The reproduction terminal of the second change-over switch is connected to receive an output signal of a reproduction reference signal generator. The phases of the reference signal from the second change-over switch and a comparison signal from the first change-over switch are compared by a phase comparator. The phase comparator produces a deviation amount in the form of a digital amount, and the deviation output is converted to a pulse width modulation (PWM) signal by means of a first PWM modulating circuit and then supplied to an active filter.

The speed detector produces the deviation of the frequency of the output pulse signal of the Schmitt trigger circuit with respect to the desired frequency in the form of a digital amount. The deviation output is converted to a PWM signal by means of a second PWM modulating circuit and then supplied to the active filter. The active filter adds the received deviation outputs together and supplies an output to a motor driver. The motor driver drives the capstan motor according to the output of the active filter.

In the control apparatus of the construction described above, phase control is effected in the reproduction mode so as to set the phase of the reproduction control signal supplied to the phase comparator circuit in a predetermined phase relation with respect to the reference signal of the reproduction reference signal generator. At the same time, speed control is effected so as to set the frequency (rotation frequency of the motor) of an output signal of the Schmitt trigger circuit to the desired frequency. Further, in the recording mode, phase control is effected so as to set the phase of an output signal of the frequency dividing circuit supplied to the phase comparator circuit in a predetermined relation with respect to the reference signal of the recording reference signal generator. At the same time, speed control is effected so as to set the frequency (rotation frequency of the motor) of an output signal of the Schmitt trigger circuit to the desired frequency as described above. Thus, the object of the capstan motor to be phase-controlled differs in the reproduction mode and in the recording mode, that is, the reproduction control signal and an output signal of the frequency dividing circuit are phase-controlled in the reproduction and recording modes, respectively. For this reason, special care should be taken to make the tape pattern of the transitional recording portion continuous with that of the previously recorded portion in the transitional recording mode or in a transition from the reproduction mode to the recording mode.

In the prior art, the recording reference signal generator is previously reset by an output signal of the frequency dividing circuit in the transitional recording mode to set the phase of the reference signal of the recording reference signal generator equal to that of the output signal of the frequency dividing circuit. Thus, since reference signals for the phase control are provided for two different modes and separately used for the recording and reproduction modes, servo disturbance may be prevented in the transitional recording mode.

In the control apparatus as described above, it is not necessary to control the phase of an output signal from the frequency dividing circuit in the recording mode. However, it is necessary to process the signal at the time of mode transition by use of the recording reference signal generator, frequency dividing circuit, mode selection switches and the like in order to compensate for the speed deviation in the speed control system. This makes the control apparatus complicated in construction and increases the size thereof.

SUMMARY OF THE INVENTION

In view of the fact described above, this invention has been made, and an object of this invention is to provide a motor speed control apparatus which can eliminate the speed deviation by effectively using function blocks used for the phase control, and reliably effect the speed control operation without additionally providing a specified signal processing function at the time of transition from speed and phase control mode to the mode in which only the speed control is effected.

That is, according to this invention, a motor speed control apparatus for performing speed control of a motor is provided which comprises speed detection means connected to receive a signal indicative of the rotation frequency of the motor and detect the deviation in the frequency of the signal from a desired frequency; phase detection means connected to receive a signal indicative of the rotation phase of the motor and to detect the deviation of the signal from the reference signal; integration means connected to receive one of the deviation output signals from the speed and phase detection means and to integrate the received signal; memory means for temporarily storing integrated output data from the integration means; and driving control means for, when in a first mode, in which only the speed control is effected, supplying the deviation output signal from the speed detection means to the integration means and controlling the operation of the motor according to the integrated output data, and when in a second mode, in which speed and phase controls are effected, supplying the deviation output signal from the phase detection means to the integration means, adding together the integrated output data and the deviation output signal from the speed detection means and controlling the operation of the motor on the basis of the result of addition, the and controlling the operation of the motor on the basis of the integrated data stored in the memory means at the time of transition from the second mode to the first mode.

DETAILED DESCRIPTION OF THE PREFERRED EMBODIMENTS

Figure 1:
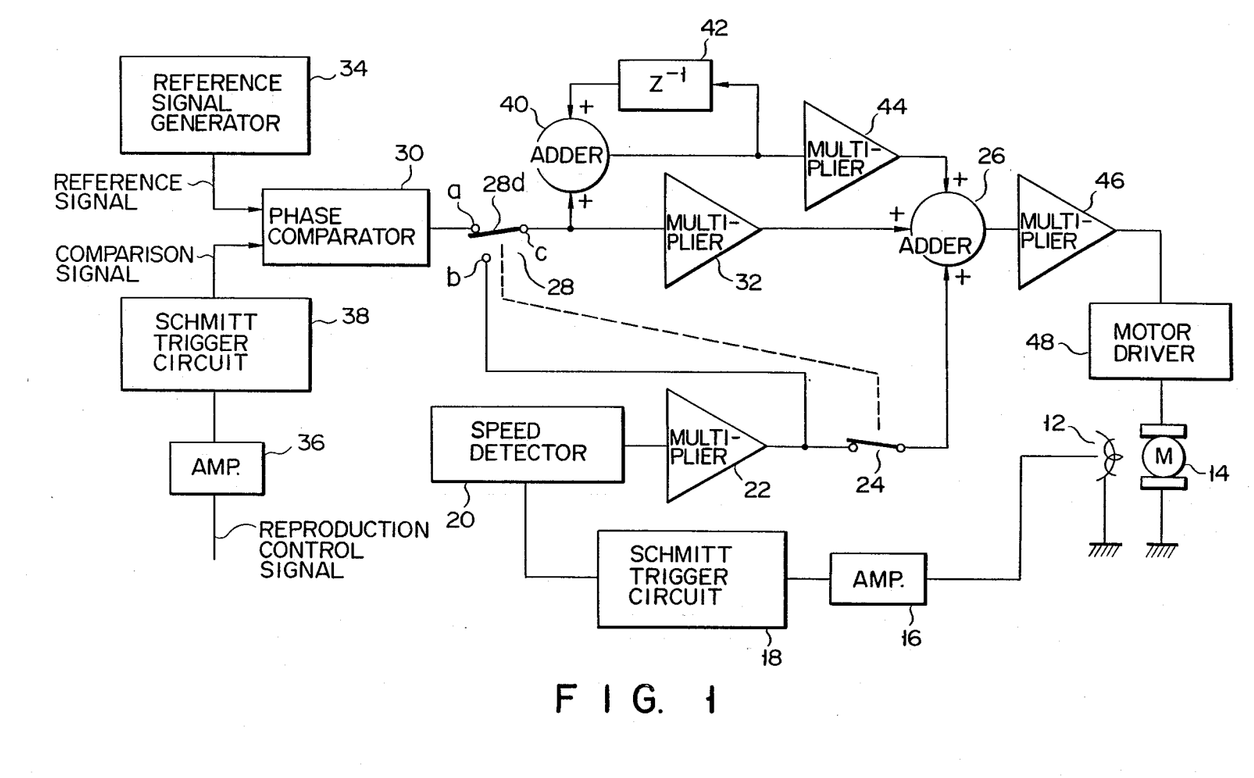
FIG. 1 is a block diagram of a motor speed control apparatus according to one embodiment of this invention.

Frequency generator 12 is mounted on the capstan rotation shaft of capstan motor 14 in the VTR. Frequency generator 12 generates a signal of a frequency proportional to the rotation speed of capstan motor 14. An output signal from frequency generator 12 is amplified by amplifier (AMP.) 16 and then converted to a pulse signal y Schmitt trigger circuit 18 which in turn supplies an output signal to speed detector 20. Speed detector 20 functions to measure the time between the pulses of an output signal from Schmitt trigger circuit 18 and produces a digital value "0" when the measured time becomes equal to a preset desired value. Further, it produces a positive digital value corresponding to the difference between the measured value and the desired value when the measured time is longer than the desired time, and produces a negative digital value corresponding to the difference between the measured value and the desired value when the measured time is shorter than the desired time.

An output signal from speed detector 20 is multiplied by a predetermined coefficient by multiplier 22 and then supplied to adder 26 via ON-OFF switch 24. ON-OFF switch 24 is set ON (closed state) in the reproduction mode and OFF (open state) in the recording mode. An output signal of speed detector 20 multiplied by multiplier 22 is also supplied to terminal b of change-over switch 28. Change-over switch 28 is drivingly coupled with ON-OFF switch 24, and movable contact 28d is set to terminal a in the reproduction mode and to terminal b in the recording mode. Terminal a of change-over switch 28 is connected to phase comparator 30 and terminal c is connected to multiplier 32.

For example, a reference signal from reproduction reference signal generator 34 is supplied to phase comparator 30. Further, phase comparator 30 is connected to receive a control signal as a comparison signal which can be obtained by reproducing a reproduction control signal recorded on the tape to be reproduced by a reproduction circuit (not shown), to amplify the reproduced signal by means of amplifier 36 and then to shape the waveform of the amplified signal by means of Schmitt trigger circuit 38. Phase comparator 30 compares the phases of the reference signal and comparison signal, and produces a digital value "1" when they are in phase with each other. When the comparison signal is delayed in phase with respect to the reference signal, a positive digital value corresponding to the delayed amount is produced, and when the comparison signal advances in phase with respect to the reference signal, a negative digital value corresponding to the advancing amount is produced. Phase comparator 30 functions to produce a digital value "0" until a detection signal from speed detection circuit 20 becomes a value within the preset range containing the preset desired value therein.

Terminal c of change-over switch 28 is connected to adder 40. Adder 40 is connected to receive data which is produced therefrom and supplied via data register ($Z^{-1}$) 42 and one of the output data (deviation output data) of speed detector 20 and the output data (deviation output data) of phase comparator 30 supplied via change-over switch 28, and adds the received data together. This makes it possible to attain an integrated output from adder 40. Data register 42 functions to store output data from adder 40. That is, data register 42 stores deviation output data from speed detector 20 or phase comparator 30. The content of data register 42 is kept unchanged until the detection output of speed detector 20 comes into the preset range.

Output data of adder 40 is also supplied to adder 26 via multiplier 44. Adder 26 adds together output data of multiplier 32, output data of multiplier 44 and output data which is produced from speed detector 20, amplified and supplied via ON-OFF switch 24, and supplies the addition result to multiplier 46. Output data from multiplier 46 is supplied to motor driver 48 including a digital/analog converter (not shown), and motor driver 48 drives capstan motor 14 according to the received data.

Output $K_{AFC}(T_o-T)$ is attained from speed detector 20 in FIG. 1. In this case, $T_o$ is equal to $1/o_f$ ($o_f$ is a desired frequency), T is equal to $1/f$ (f is an actual frequency), and $K_{AFC}$ is a gain of speed detector 20.

In contrast, rotation frequency fm of capstan motor 14 is given as follows:

$$fm = \{K_{AFC}(To-T)+A\} \times K_M$$

where $K_M$ is a gain of motor 14 and A is a constant. Thus, actual rotation of motor 14 is dependent on the gain of motor 14. Therefore, in the case where proportional control in which only the detection output of speed detector 20 is fed back to make the rotation frequency constant is effected, only the control by feedback of the deviation between the desired frequency and the actual frequency is effected and therefore the deviation component cannot be completely eliminated.

Therefore, a system in which the deviation component is integrated is fed back, or the integration control system is added so as to completely absorb the deviation component is produced. That is, rotation frequency fm of motor 14 can be obtained as follows:

$$fm = \{K_{AFC}(To-T)+\Sigma K_{AFC}(To-T)+A\} \times K_M$$

Thus, rotation frequency fm becomes stable in a state in which the deviation amount is accumulated in an integrated term $\{\Sigma K_{AFC}(To-T)\}$ and a proportional term $\{K_{AFC}(To-T)\}$ becomes zero. The deviation amount is stored in data register 42.

In the control apparatus of the construction described above, ON-OFF switch 24 is set to the OFF position and change-over switch 28 is set to terminal b in the recording mode. This permits the FIG. 1 circuit to be equivalently expressed by the FIG. 2 circuit. In the recording mode, the following operation is effected to drive capstan motor 14 from the stationary mode to the desired rotation speed. That is, at the time of triggering capstan motor 14, a maximum positive output is produced from speed detector 20, causing motor driver 48 to forcedly accelerate motor 14. After this, when the rotation speed of capstan motor 14 reaches a value in a preset range defined with respect to the desired rotation speed, data register 42 which has stored data of constant value starts to operate and store deviation output data of speed detector 20. Thus, the speed control apparatus operates to set the output of speed detector 20 to "0". That is, motor driver 48 controls the operation of capstan motor 14 to set the rotation speed of capstan motor 14 to the desired rotation speed.

In the reproduction mode, ON-OFF switch 24 is set ON, and change-over switch 28 is set to terminal a. This permits the FIG. 1 circuit to be equivalently expressed by the FIG. 3 circuit. In the reproduction mode, the following operation is effected to drive capstan motor 14 from the stationary mode to the desired rotation speed. That is, at the time of triggering capstan motor 14, a maximum positive output is produced from speed detector 20 and constant data is stored in data register 42, causing motor driver 48 to forcedly accelerate motor 14. After this, when the rotation speed of capstan motor 14 reaches a value in a preset range determined with respect to the desired rotation speed, data register 42 starts to operate and store deviation output data of phase comparator circuit 30. Thus, the speed control apparatus operates to set the output of phase comparator circuit 30 to "0". That is, motor driver 48 controls the operation of capstan motor 14 to set the rotational phase of capstan motor 14 to the desired rotational phase.

Figure 2:
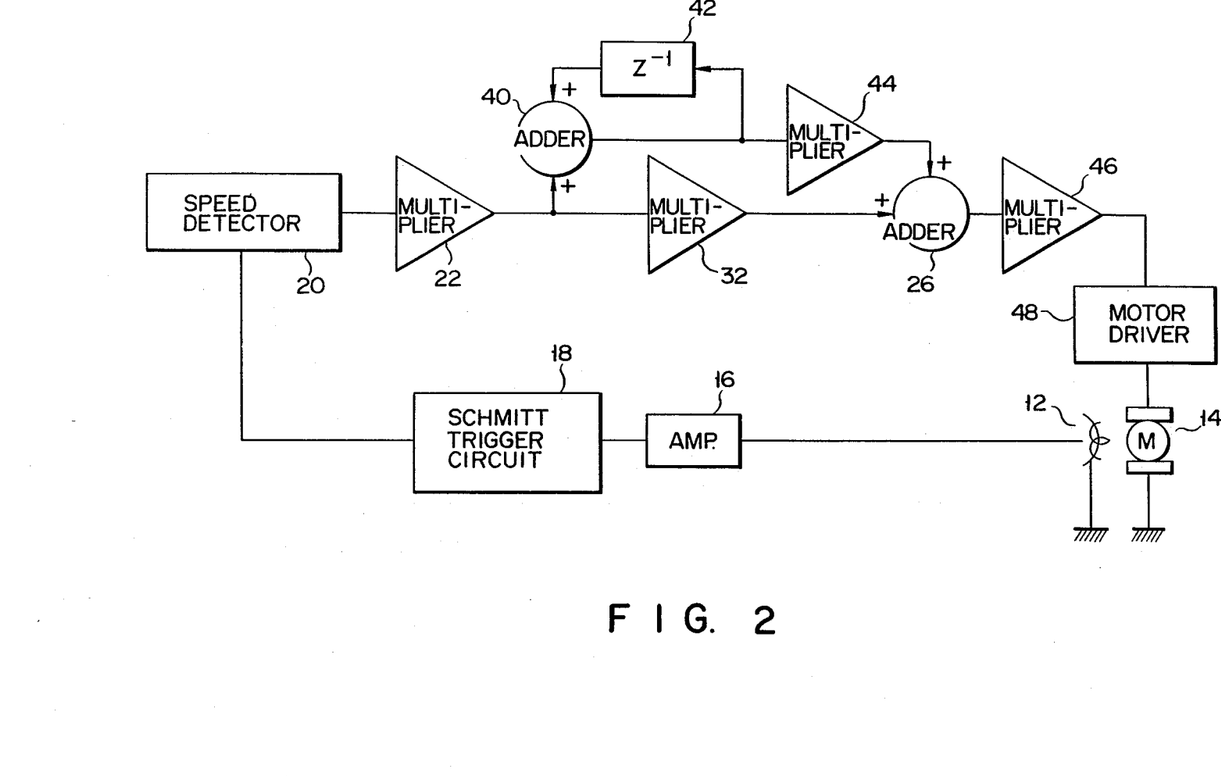
FIG. 2 is an equivalent block diagram illustrating the operation of the motor speed control apparatus of FIG. 1 in the recording mode.
Figure 3:
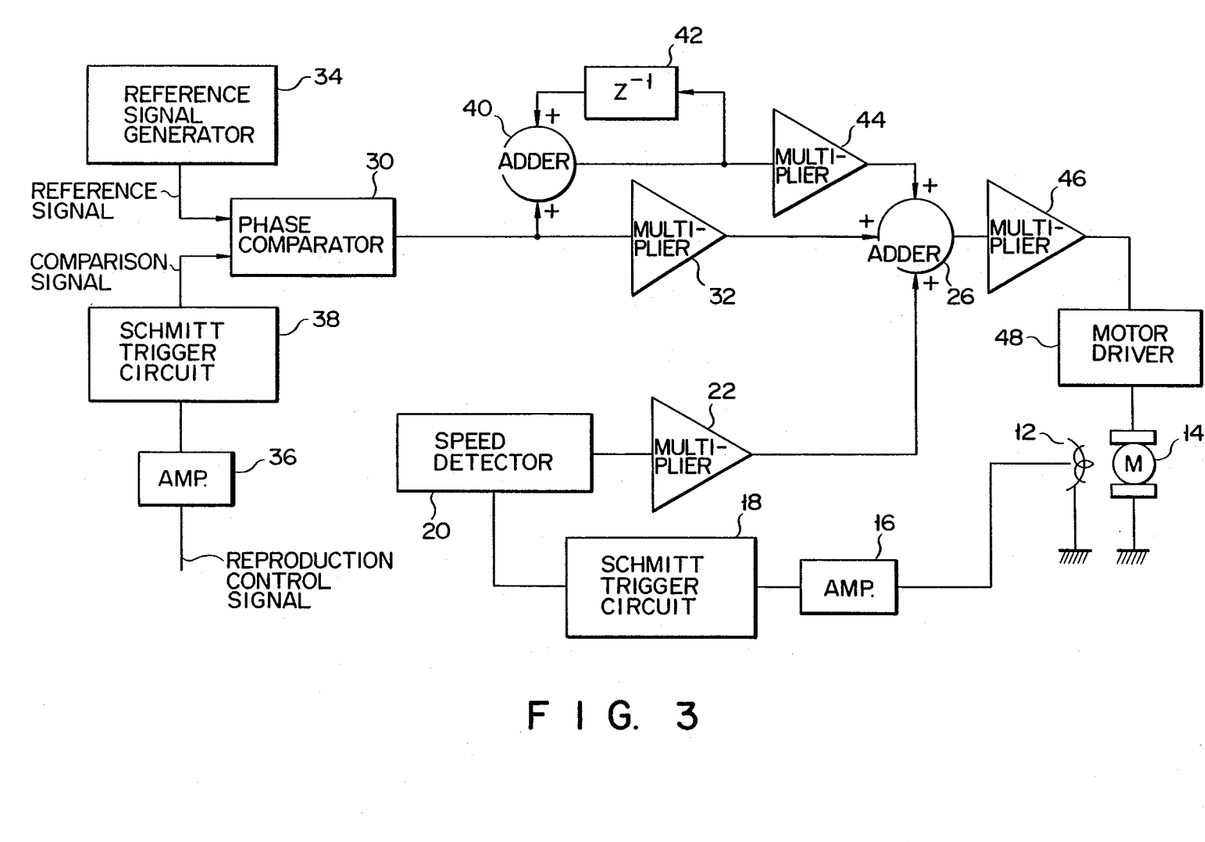
FIG. 3 is an equivalent block diagram illustrating the operation of the motor speed control apparatus of FIG. 1 in the reproduction mode.

Further, the operation mode can be changed from the state in which phase control is effected (that is, the reproduction mode as shown in FIG. 3) to the state in which phase control is not effected (that is, the recording mode as shown in FIG. 2) by using an output of speed detector 20 instead of an output of phase comparator circuit 30 and setting the coefficient of each multiplier to a suitable value. At the time of mode transition, since the content of data register 42 can be held, no servo disturbance will occur.

Figure 4:
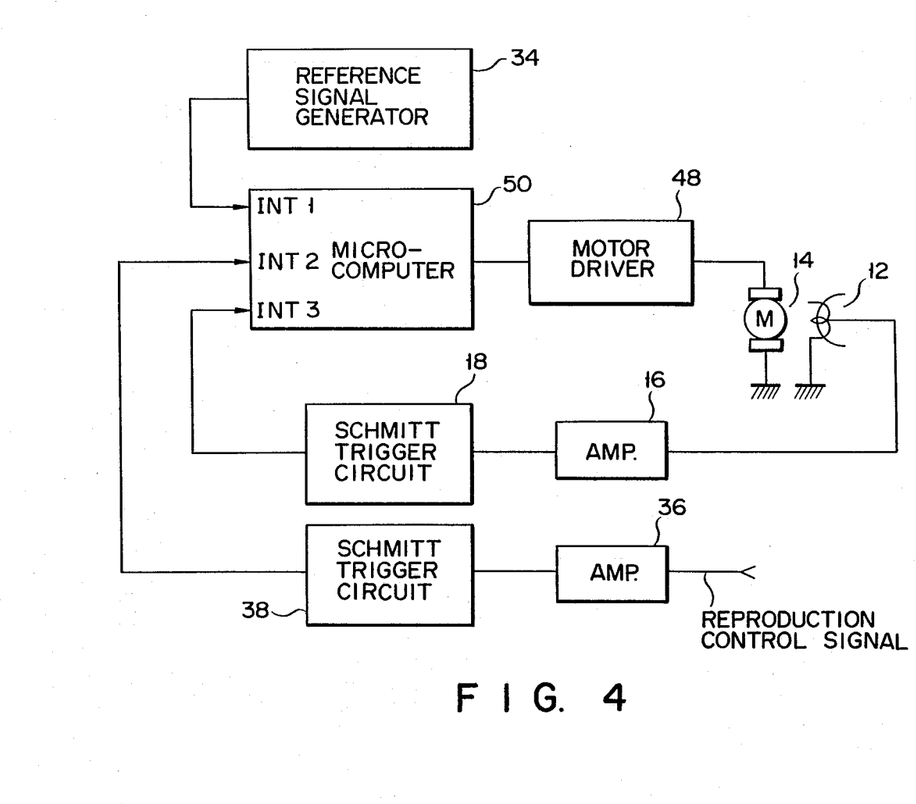
FIG. 4 is a block diagram of a motor speed control apparatus according to another embodiment of this invention utilizing, a microcomputer.

The operation explained with reference to FIGS. 1 to 3 can be easily effected by use of the operating process of a microcomputer. FIG. 4 shows an embodiment of this invention utilizing microcomputer 50. In FIG. 4, portions corresponding to those in FIG. 1 are denoted by the same reference numerals.

First interrupt terminal INT1 of microcomputer 50 is connected to receive a reference signal from reproduction reference signal generator 34. Second interrupt terminal INT2 of microcomputer 50 is connected to receive a signal which is obtained by amplifying the reproduction control signal by amplifier 36 and then shaping the waveform of the amplified signal by Schmitt trigger circuit 38. Third interrupt terminal INT3 of microcomputer 50 is connected to receive a signal which is obtained by amplifying the reproduction control signal by amplifier 16 and then shaping the waveform of the amplified signal by Schmitt trigger circuit 18. Microcomputer 50 latches the content of an internal timer counter (not shown) in response to each interrupt signal to detect the rotation speed and rotational phase. Then, it compares them with the respective desired values, integrates the deviation components with respect to time and feeds back the integrated value to supply to motor driver 48 data which is necessary to drive capstan motor 14.

Figure 5:
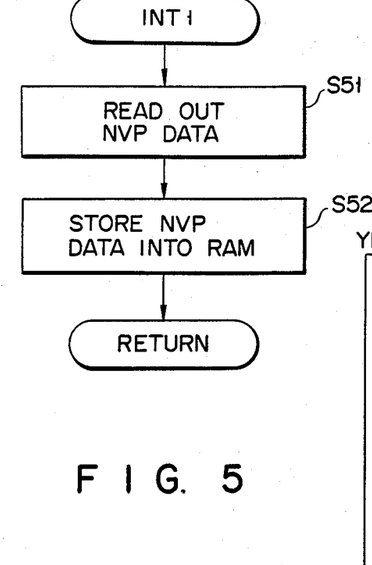
FIGS. 5 to 7 are flowcharts illustrating the operation of the microcomputer used in the motor speed control apparatus of FIG. 4.
Figure 6:
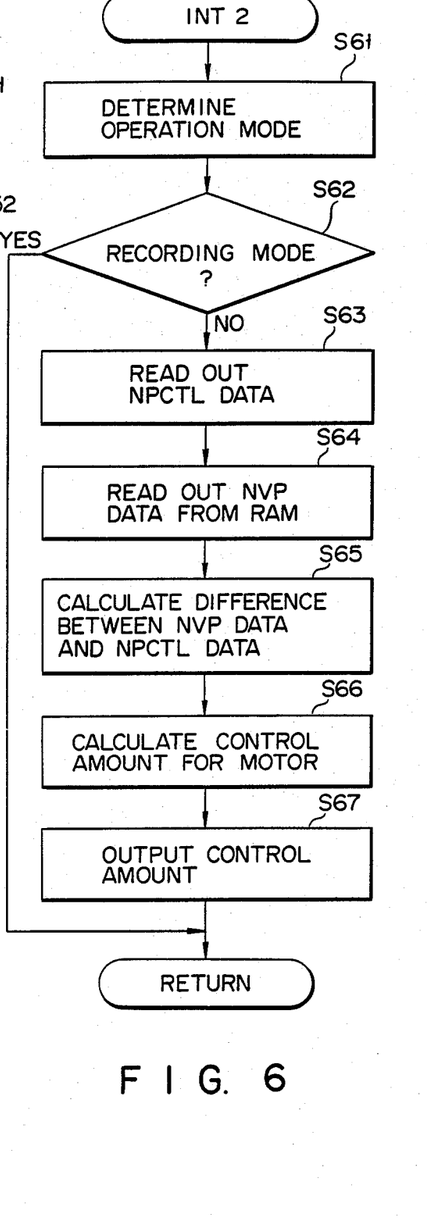
Figure 7:
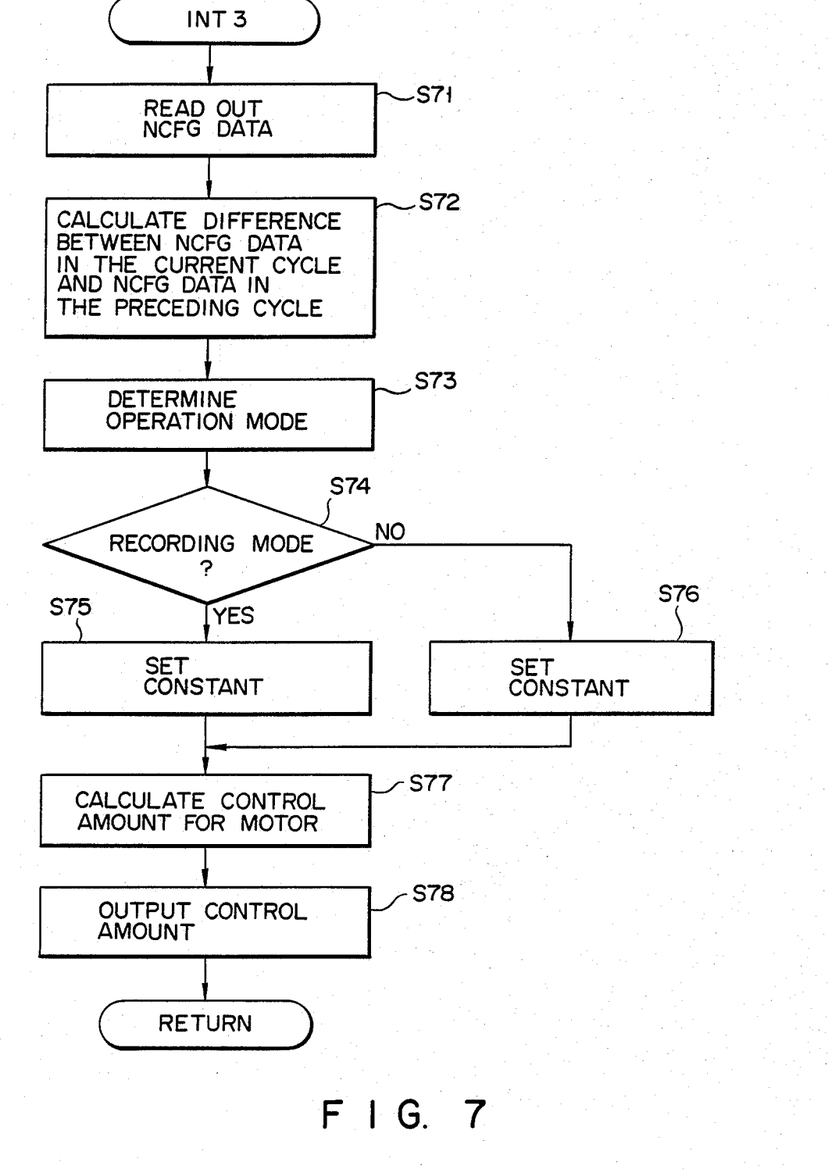

FIGS. 5 to 7 are flowcharts illustrating the operation of microcomputer 50. FIG. 5 is a flowchart illustrating the operation in the case where an interrupt signal is supplied to first interrupt terminal INT1 of microcomputer 50, FIG. 6 is a flowchart illustrating the operation in the case where an interrupt signal is supplied to second interrupt terminal INT2, and FIG. 7 is a flowchart illustrating the operation in the case where an interrupt signal is supplied to third interrupt terminal INT3.

When a signal from reproduction reference signal generator 34 is supplied to first interrupt terminal INT1 of microcomputer 50, as is shown in FIG. 5, microcomputer 50 reads out data of arrival time (NVP data) from the internal timer (step S51). Then, the readout NVP data is stored in an internal RAM (not shown) (step S52).

When a signal from Schmitt trigger circuit 38 is supplied to second interrupt terminal INT2 of microcomputer 50, as is shown in FIG. 6, microcomputer 50 determines the operation mode (step S61). If the reproduction mode is detected (step S62), data of arrival time (NPCTL data) is read out from the internal timer (step S63). Then, NVP data is read out from the internal RAM (step S64), and a difference between the readout NVP data and NPTCL data read out from the internal timer is calculated (step S65). After this, the control amount for capstan motor 14 is calculated based on the calculated difference (step S66) and the control amount data is supplied to motor driver 48 (step S67).

When a signal from Schmitt trigger circuit 18 is supplied to third interrupt terminal INT3 of microcomputer 50, as is shown in FIG. 7, microcomputer 50 reads out data of arrival time (NCFG data) from the internal timer (step S71). Then, a difference between the NCFG data thus read out and the NCFG data obtained in the preceding cycle is calculated (step S72). At this time, the operation mode is determined (step S73), and a constant is set according to the determined operation mode (steps S74 to S76). Then, the control amount for capstan motor 14 is calculated based on the calculated difference and the set constant (step S77), and the control amount data is supplied to motor driver 48 (step S78).

Although the capstan has been explained as being driven by the direct drive method, the present invention can be applied to an apparatus using a belt drive. That is, the present invention can be applied to an apparatus which controls a motor so that the speed and phase of a rotating body as driven by a motor may be made to have predetermined values.

As described above, according to the motor speed control apparatus of this invention, the rotation speed and phase of capstan motor 14 can be effectively and reliably controlled in the reproduction, recording and transitional recording modes without using the frequency divider, mode change-over switch and recording reference signal generator and the like which have been required in the prior art.

This invention is not limited to the control of the capstan motor of VTR, and can attain the same effect and operation when it is applied to the control of other motors which have speed and phase control systems and are set in an operation mode in which no speed control is required.

What is claimed is:

1. A control apparatus for performing speed control of a motor, comprising:
    speed detection means connected to receive a signal indicative of the rotation frequency of the motor and to detect the deviation in the frequency of the signal from a desired frequency;
    phase detection means connected to receive a signal indicative of the rotation phase of motor and to detect the deviation of the signal from a reference signal;
    integration means connected to receive one of deviation output signals from said speed and phase detection means and to integrate the received signal;
    memory means for temporarily storing integrated output data from said integration means; and
    driving control means for, when in a first mode, in which only the speed control is effected, supplying the deviation output signal from said speed detection means to said integration means and controlling the operation of the motor according to the integrated output data, and when in a second mode, in which speed and phase controls are effected, supplying the deviation output signal from said phase detection means to said integration means, adding together the integrated output data and the deviation output signal from said speed detection means and controlling the operation of the motor on the basis of the result of addition, and controlling the operation of the motor on the basis of the integrated data, which is stored in said memory means, at the time of transition from the second mode to the first mode.

2. The control apparatus according to claim 1, wherein said driving control means comprises:
    selective supplying means for selectively supplying deviation outputs of said speed detection means and phase detection means to said integration means;
    adding means for adding together output data of said integration means and a deviation output of said speed detection means;
    deviation output supplying means for, when in the second mode, supplying a deviation output of said speed detection means to said adding means; and
    driving means for driving the motor according to the result of addition performed by said adding means.

3. The control apparatus according to claim 2, wherein said driving control means further comprises integration data supplying means for supplying integration data stored in said memory means to said adding means at the time of transition from the second mode to the first mode.

4. The control apparatus according to claim 1, wherein said integration means comprises adding means for adding together one of deviation outputs of said speed detection means and phase detection means, which is supplied under the control of said driving control means, and the integration data stored in said memory means.

5. The control apparatus according to claim 1, further comprising rotation frequency measuring means for measuring the rotation frequency of the motor and supplying the result of measurement to said speed detection means.

6. The control apparatus according to claim 1, wherein said speed detection means, phase detection means, integration means, memory means, and driving control means are realized by a microcomputer.

7. A control apparatus for performing speed control of a capstan motor for a video tape recorder, comprising:
    speed detection means connected to receive a signal indicative of the rotation frequency of a capstan derived by the capstan motor for driving a tape and to detect the deviation in the frequency of the signal from a desired frequency;
    phase detection means connected to receive a signal indicative of the rotation phase of the capstan and to detect the deviation of the signal from a reference signal;
    integration means connected to receive one of deviation output signals from said speed and phase detection means and to integrate the received signal;
    memory means for temporarily storing integrated output data from said integration means; and
    driving control means for, when in a recording mode, in which only the speed control is effected, supplying the deviation output signal from said speed detection means to said integration means and controlling the operation of the capstan motor according to the integrated output data, and when in a reproduction mode, in which speed and phase controls are effected, supplying the deviation output signal from said phase detection means to said integration means, adding together the integrated output data and the deviation output signal from said speed detection means and controlling the operation of the capstan motor on the basis of the result of the addition, and controlling the operation of the capstan motor on the basis of the integrated data, which is stored in said memory means, at the time of transition from the reproduction mode to the recording mode.

8. The control apparatus according to claim 7, wherein said driving control means comprises:

selective supplying means for selectively supplying deviation outputs of said speed detection means and phase detection means to said integration means;

adding means for adding together output data of said integration means and a deviation output of said speed detection means;

deviation output supplying means for, when in the reproduction mode, supplying a deviation output of said speed detection means to said adding means; and driving means for driving the capstan motor according to the result of addition performed by said adding means.

9. The control apparatus according to claim 8, wherein said selective supplying means supplies the deviation output of said speed detection means to said integration means when in the recording mode, and, when in the reproduction mode, supplies the deviation output of said phase detection means to said integration means.

10. The control apparatus according to claim 8, wherein said driving control means further comprises integration data supplying means for supplying integration data stored in said memory means to said adding means at the time of transition from the reproduction mode to the recording mode.

11. The control apparatus according to claim 7, wherein said integration means comprises adding means for adding together one of deviation outputs of said speed detection means and phase detection means, which is supplied under the control of said driving control means, and the integration data stored in said memory means.

12. The control apparatus according to claim 7, further comprising rotation frequency measuring means for measuring the rotation frequency of the capstan and supplying the result of measurement to said speed detection means.

13. The control apparatus according to claim 7, wherein said speed detection means, phase detection means, integration means, memory means, and driving control means are realized by a microcomputer.

14. The control apparatus according to claim 7, wherein said signal indicative of the rotation phase of the capstan comprises a reproduction control signal.

15. A method for performing speed control of a motor, comprising the steps of:

detecting a frequency deviation, from a desired frequency, of a frequency of a signal indicative of a rotational speed of a motor;

detecting a phase deviation, from a reference signal, of a signal indicative of a rotational phase of the motor;

integrating the frequency deviation output in a first mode, in which only speed control is effected, temporarily storing a resultant data of integration, and driving the motor on the basis of the resultant data of integration;

integrating the phase deviation output in a second mode, in which speed control and phase control are effected, temporarily storing a resultant data of integration, adding together the resultant data of integration and the frequency deviation output, and driving the motor on the basis of the result of addition; and driving the motor on the basis of the resultant data of integration, which is temporarily stored in the second mode, at the time of transition from the second mode to the first mode.

16. The method according to claim 15, wherein said integration is effected by adding one of the frequency and phase deviation outputs to the integration output data temporarily stored.

17. The method according to claim 15, further comprising the step of measuring the rotation frequency of the motor.

* * * * *